United States Patent [19]

Conway

[11] Patent Number: 4,853,088
[45] Date of Patent: Aug. 1, 1989

[54] SOLAR ENHANCED SEPARATION OF VOLATILE COMPONENTS FROM A LIQUID

[75] Inventor: David D. Conway, Littleton, Colo.

[73] Assignee: Marathon Oil Company, Findlay, Ohio

[21] Appl. No.: 180,735

[22] Filed: Apr. 12, 1988

[51] Int. Cl.⁴ .............................................. B01D 3/28
[52] U.S. Cl. ...................... 203/10; 203/14; 203/49; 203/86; 203/100; 203/DIG. 1; 202/176; 202/234; 202/238; 202/267.1; 159/28.6; 159/903; 159/DIG. 40; 196/115; 208/362; 208/367; 208/369
[58] Field of Search .................. 203/10, 49, 86, 89, 203/14, 100, DIG. 1; 202/176, 234, 236, 267.1, 238, 175, 265; 159/49, 903, 28.6, DIG. 40; 55/52; 196/115, 121, 123, 128; 208/360, 362, 367, 369

[56] References Cited

U.S. PATENT DOCUMENTS

| | | | |
|---|---|---|---|
| 3,167,488 | 1/1965 | Malek | 159/903 |
| 3,224,948 | 12/1965 | Akers | 159/903 |
| 3,291,704 | 12/1966 | Diedrich et al. | 203/10 |
| 3,469,617 | 9/1969 | Palmason | 159/28.6 |
| 4,078,976 | 3/1978 | Spears, Jr. | 203/10 |
| 4,159,228 | 6/1979 | Bellande et al. | 203/10 |
| 4,178,202 | 12/1979 | Thomas et al. | 159/903 |
| 4,270,981 | 6/1981 | Stark | 202/172 |
| 4,329,205 | 5/1982 | Tsumura et al. | 159/28.6 |
| 4,363,703 | 12/1982 | ElDifrawi et al. | 203/10 |
| 4,370,236 | 1/1983 | Ferguson | 210/634 |
| 4,383,891 | 5/1983 | Clavier | 159/903 |
| 4,396,463 | 8/1983 | Josis et al. | 203/10 |
| 4,402,793 | 9/1983 | Petrek et al. | 202/234 |
| 4,440,861 | 4/1984 | McCarthy | 159/903 |
| 4,487,659 | 12/1984 | Stark | 202/172 |
| 4,488,934 | 12/1984 | Silvis | 202/234 |
| 4,495,034 | 1/1985 | Lucas | 202/181 |
| 4,585,522 | 4/1986 | Beck et al. | 202/234 |
| 4,640,740 | 2/1987 | Moore et al. | 159/28.6 |
| 4,731,159 | 3/1988 | Portea et al. | 159/28.6 |

FOREIGN PATENT DOCUMENTS

0357605 9/1931 United Kingdom .............. 159/28.6

Primary Examiner—David L. Lacey
Assistant Examiner—V. Manoharan
Attorney, Agent, or Firm—Jack L. Hummel; Rodney F. Brown

[57] ABSTRACT

A process and apparatus for separating volatile components from a volatile-containing liquid by a stripping gas flowing countercurrent to the liquid. Separation of the volatile components is enhanced by heating the liquid with radiant solar energy and agitating the liquid as it flows.

20 Claims, 5 Drawing Sheets

SOLAR ENHANCED SEPARATION OF VOLATILE COMPONENTS FROM A LIQUID

BACKGROUND OF THE INVENTION

1. Technical Field

The invention relates to an apparatus and process for separating volatile components from a liquid and more particularly to an apparatus and process which utilizes radiant solar energy to enhance the separation of volatile components from a liquid.

2. Background Information

Fluid separation processes cover a broad spectrum of applications, employing such mechanisms as solvent extraction, chromatography, evaporation, stripping, or combinations of these mechanisms. For example, U.S. Pat. Nos. 4,078,976 to Spears, Jr. and 4,363,703 to ElDifrawi et al utilize evaporative separation to desalinize seawater. U.S. Pat. Nos. 4,270,981 and 4,487,659 both to Stark utilize solar distillation to desalinize seawater. U.S. Pat. No. 4,495,034 to Lucas separates solids and solvents chromatographically from a liquid waste effluent. U.S. Pat. No. 4,396,463 to Josis et al employs vapor stripping to remove ammonium compounds, phenol constituents, and other contaminants from a coking plant waste water. U.S. Pat. No. 4,370,236 to Ferguson employs solvent extraction to remove particulates and water-soluble contaminants from a liquid hydrocarbon stream.

The present invention addresses a need for a specific apparatus and process to remove volatile components from a liquid. The technology of the above-cited art is, for the most part, relatively complex to construct and operate. Thus, there is a particular need for a simple low-cost separation apparatus and process to remove volatile components from a liquid which is relatively easy to operate, even in remote field locations.

SUMMARY OF THE INVENTION

The present invention provides a process and apparatus for effectively removing volatile components from a liquid. According to the process of the present invention, a liquid containing one or more volatile components is fed into the top of an enclosed separation unit and downward under the force of gravity across an inclined heated flow plate having an uneven surface. The flow plate simultaneously heats and agitates the liquid as it flows downward. The combined effect of heating and agitation enhances the ability of a gas to strip volatile components from the liquid as the stripping gas flows in an upward countercurrent direction through a head space above the flow plate.

The stripping gas, which is fed into the bottom of the separation unit, contacts the liquid and sweeps all of the volatile components in the head space out the top of the unit. A substantially volatile-free liquid is simultaneously recovered from the bottom of the unit.

Heat is provided to the flow plate by radiant solar energy, which passes through a translucent face plate covering the front of the unit. The solar energy heats the flow plate which transfers the heat to the flowing liquid. In addition, the volatile-containing liquid can be preheated before it is fed to the separation unit to reduce the heating requirements of the flow plate.

The apparatus of the present invention can be structured so that two or more of the above-described separation units operate in series or in parallel with the requisite pumps and piping. A preheating unit can also be placed upstream of one or more of the separation units. The preheating unit comprises a continuous coiled pipe contained within an enclosure to preheat the liquid feed using solar energy as it flows through the pipe.

The present invention has wide ranging utility. It is advantageously applicable to the separation of volatile hydrocarbon contaminants from contaminated surface or groundwater in the evironment. The invention is also useful for the treatment of process water to remove dissolved or entrained gasses which can be detrimental to process equipment or the product. These and other embodiments of the invention are described in further detail below.

DESCRIPTION OF PREFERRED EMBODIMENTS

The present invention is an apparatus and process for treating a volatile-containing liquid to remove the volatile components from the liquid. The volatile-containing liquid treated according to the present invention is a homogeneous liquid composition having one or more volatile components contained in a liquid medium.

The volatile components in the volatile-containing liquid are in a gaseous or a liquid state and are entrained, dissolved, mixed, suspended, emulsified or the like in the liquid medium such that the components are substantially incapable of mechanical separation from the medium. The total concentration of volatiles in the volatile-containing liquid is substantially lower than the concentration of the medium in the volatile-containing liquid. The volatiles preferably have a lower boiling point than that of the liquid medium and most preferably have a lower boiling point than the operating temperature of the separation unit so that substantially all the volatiles may be vaporized into the stripping gas in the separation unit.

The medium is in a liquid state and constitutes the bulk of the volatile-containing liquid. The medium preferably has a higher boiling point than the operating temperature of the separation unit, such that the medium does not substantially volatilize when the volatile-containing liquid is heated to the operating temperature of the separation unit. A preferred medium having these charatericstics is water.

Figure 1:
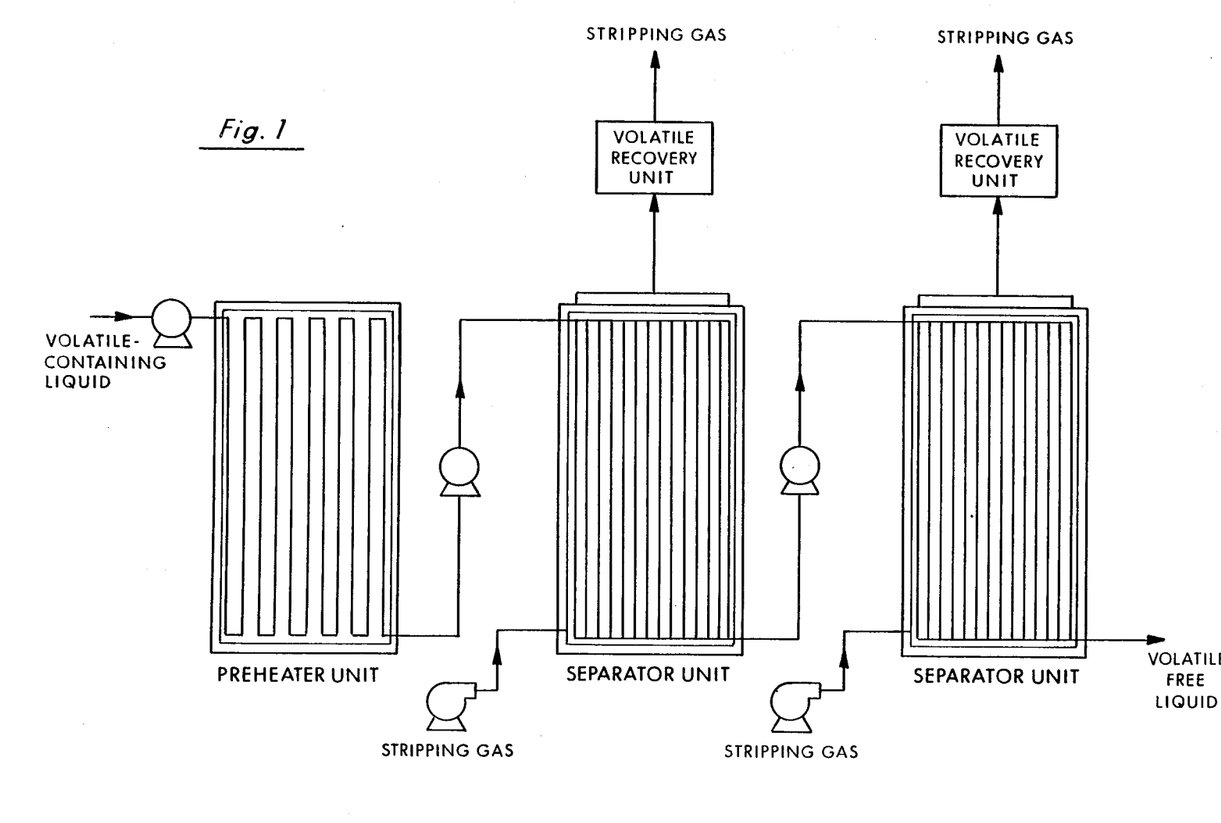
FIG. 1 shows a block diagram of the present operating units aligned in series.
Figure 2:
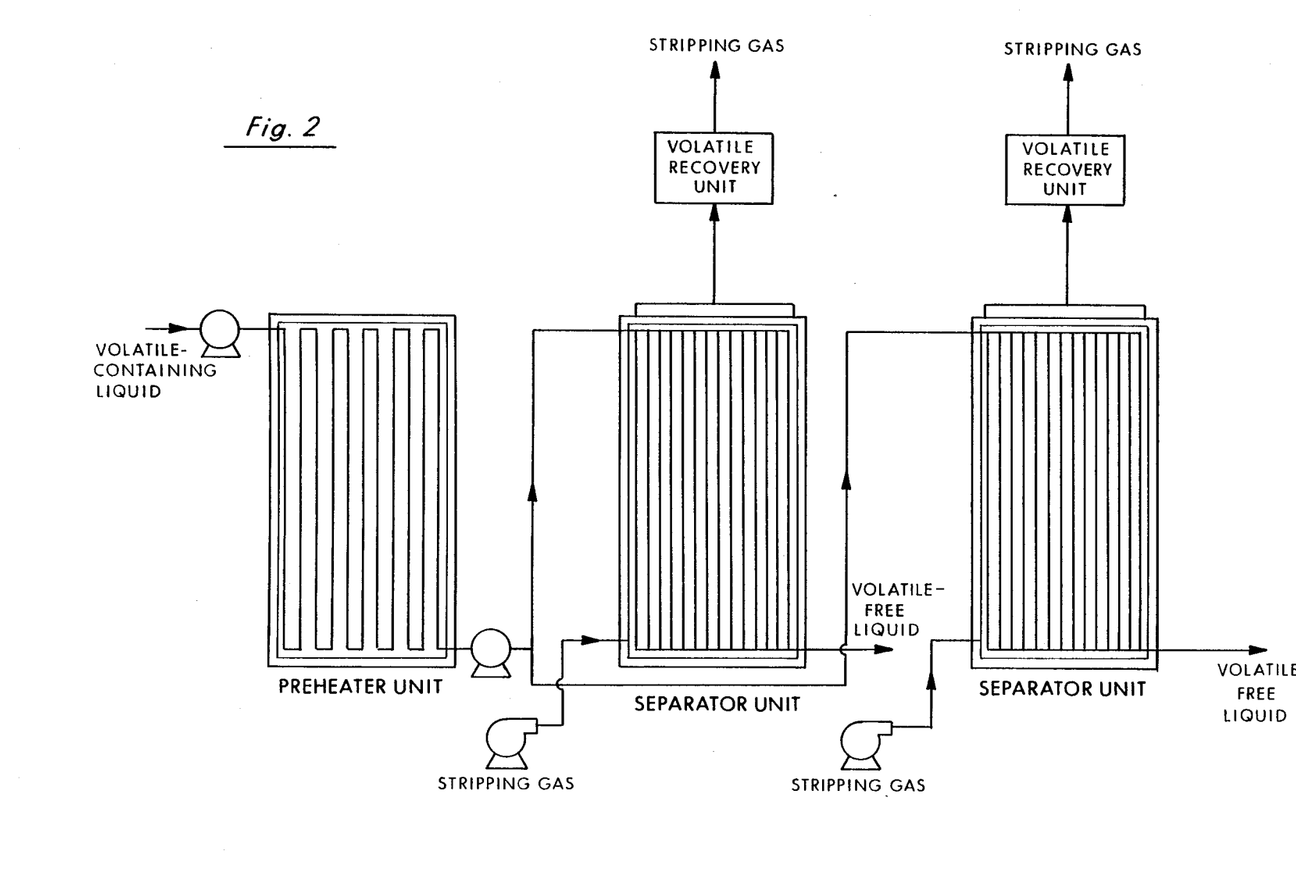
FIG. 2 is a block diagram of the present operating units aligned in parallel.
Figure 3:
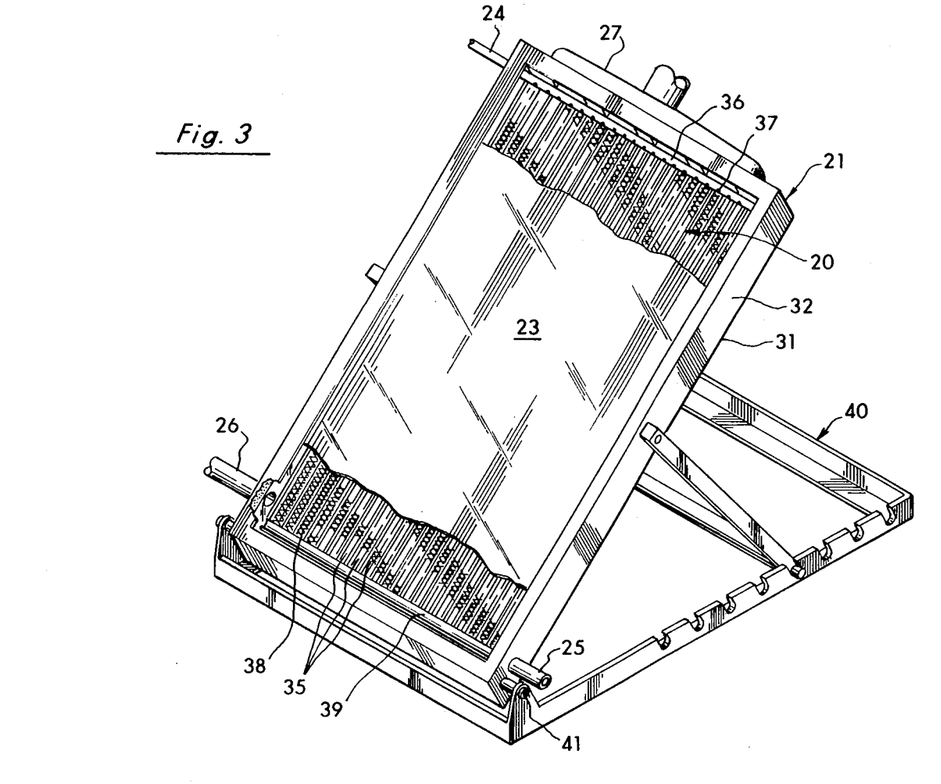
FIG. 3 shows a perspective view of the separation unit.
Figure 4:
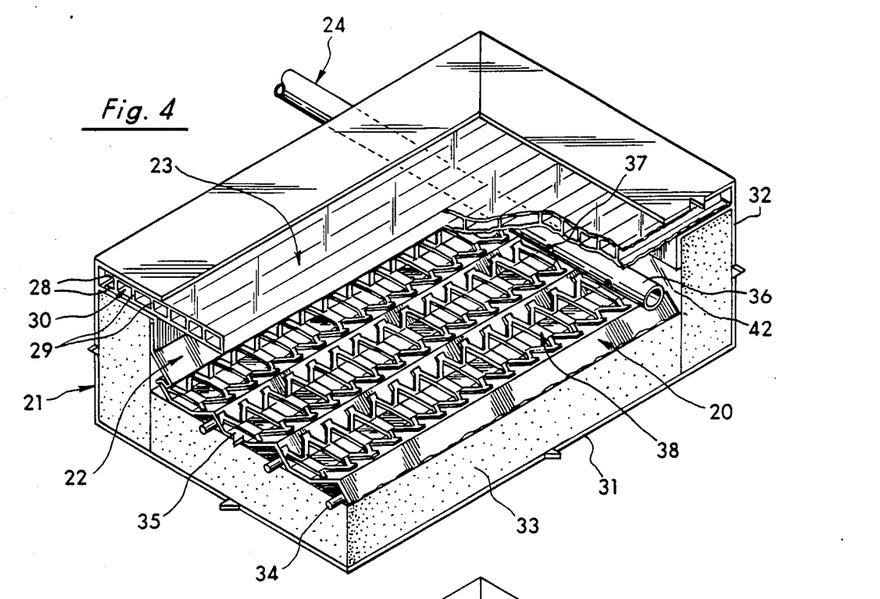
FIG. 4 shows a cutaway view of the separation unit.

The basic operating unit of the present invention is the separation unit as shown in FIGS. 3 and 4. A plurality of separation units can operate in series as shown schematically in FIG. 1 or in parallel as shown schematically in FIG. 2. Alternatively, a single separation unit can operate as a stand-alone unit. It is understood that the separation unit as described below with reference to FIGS. 3 and 4 is adaptable to operate in any of these modes.

The separation unit comprises a flow plate 20 fixed within a box-like enclosure 21 such that a void space 22 exists between the surface of the flow plate 20 and the front face 23 of the enclosure. The front face 23 of the enclosure is a translucent panel which allows solar radiation to penetrate the panel into the interior of the enclosure where it is converted to heat.

The enclosure 21 has a volatile-containing liquid inlet 24 at its upper end and a substantially volatile-free liquid outlet 25 at its lower end. The enclosure 21 further has a stripping gas inlet 26 at its lower end, which may be equipped with a gas blower shown schematically in FIGS. 1 and 2, and a stripping gas outlet manifold 27 at its upper end. The stripping gas outlet 27 can vent directly to the atmosphere or it may be equipped with a volatile recovery unit as shown schematically in FIGS. 1 and 2. Exemplary recovery units are an activated carbon filter or a condenser.

The translucent face panel 23 of the enclosure is preferably made of a transparent material such as clear glass or plastic. The panel 23 may be dual paned to insulate the interior of the enclosure 21 from heat loss and to enhance the effectiveness of the solar heating. The preferred panel 23 as shown in FIG. 4 has dual panes 28 with transparent perpendicular walls 29 between the panes to form a plurality of individual isolated parallel chambers 30 which maximize heat retention within the enclosure 21.

The remaining back 31 and side 32 walls of the enclosure 21 function to retain the solar generated heat in the separation unit and to contain the flow of fluids through the unit. The back 31 and side 32 walls are preferably constructed of a rigid opaque material, such as metal, which is insulated with reflective-foil 42 coated foam 33 or some other insulating material having a low thermal conductivity.

The flow plate 20 is encased entirely within the enclosure and is mounted against the insulated back wall 31 of the enclosure 21. The flow plate 20 is contructed of a material having a high thermal conductivity relative to the insulating material 33 of the walls. The flow plate 20 is preferably a metal such as aluminum. The surface of the flow plate 20 is provided with a dark coating, by such means as painting or anodizing the surface black. The coating increases the energy absorbency of the surface.

The flow plate 20 functions both as a solar collector and a heat transfer element. The flow plate 20 converts radiant solar energy which passes through the translucent face 23 of the enclosure 21 to heat and transfers the heat to the volatile-containing liquid as it flows across the plate 20. The amount of heat available for heat transfer from the flow plate 20 can be supplemented by attaching a conductive heat source directly to the plate such as an electric heating element 34 as shown in FIG. 4.

The plate 20 is configured to maximize the heat transfer coefficient between it and the liquid flowing across it as well as to maximize the degree of liquid agitation. To achieve this objective, the plate 20 has channels 35 formed in it which are aligned longitudinally down the length of the plate 20 and which provide continuous flow paths for the liquid substantially in the direction of gravitational force. The channels 35 direct flow of the volatile-containing liquid downward across the plate 20 under the force of gravity from a liquid distributor 36 in fluid communication with the liquid inlet 24 and positioned near the top of the plate 20.

The distributor 36 is a pipe having a series of orifices 37 in it at regular intervals along its length which correspond to the spacing of the channels 35 in the plate 20. The channels 35 in the plate 20 have an irregular surface to create agitation or turbulence in the liquid as it flows down the channel 35. The channel 35 surface may be variegated by affixing protruding objects to the surface, such as small pebbles. In a preferred embodiment, a metal lattice structure 38 is welded to the channel 35 surface, which has a grid pattern substantially perpendicular to the direction of liquid flow.

A liquid collection trough 39 is positioned within the enclosure 21 at the bottom of the flow plate 20 to collect the substantially volatile-free liquid as it runs off the bottom of the flow plate channels 35. The trought 39 is in fluid communication with the liquid outlet 25 so that the volatile-free liquid product may be expelled from the enclosure 21 after treatment and recovered or released to the environment.

The entire enclosure 21 is mounted on a stand 40 which positions the flow plate 20 at an oblique angle relative to the horizontal. The stand 40 can be pivotally hinged at its base 41 to enable adjustment of the flow plate angle. The stand 40 is also manually rotatable to enable adjustment of the directional orientation of the flow plate 20. The stand 40 and enclosure 21 can be separable to facilitate transportation of the separation unit to remote sites.

Figure 5:
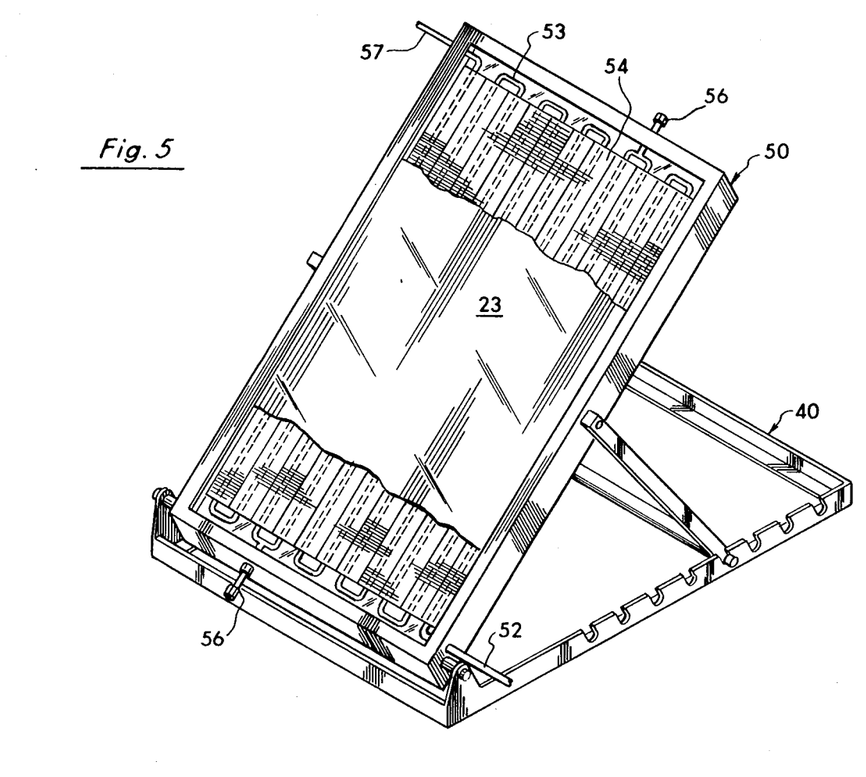
FIG. 5 shows a perspective view of the preheater unit.
Figure 6:
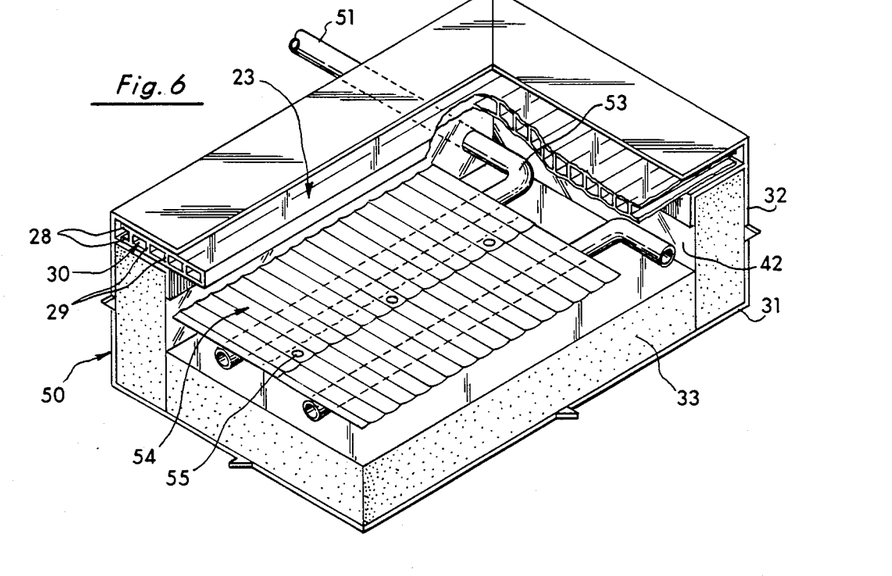
FIG. 6 shows a cutaway view of the preheater unit.

In addition to the separation unit, the apparatus of the present invention may also include a preheater unit as shown in FIGS. 5 and 6 to preheat the volatile-containing liquid before it enters the separation unit. The preheater unit comprises an enclosure 50 substantially indentical to that of the separation unit except that the preheater enclosure only has one inlet 51 and one outlet 52, which are for a cool volatile-containing liquid and a preheated volatile-containing liquid respectively. The outlet 52 feeds directly into the volatile-containing liquid inlet 24 of one or more separation units.

Instead of a flow panel, the enclosure 50 of the preheater unit contains a coiled pipe 53 connecting the liquid inlet 51 and outlet 52. The pipe 53 is fabricated from a material having a relatively high thermal conductivity, such as a metal and preferably copper. The pipe 53 has fins 54 attached to its outer surface which enhance its ability to absorb energy and heat the water. The pipe 53 and fins 54 can be coated black or a similar dark color to further enhance this effect.

The pipe 53 can be positioned such that the fins 54 overlap as the pipe 53 loops back on itself and the fins 54 are fastened with rivets 55 at the point of overlap to increase the structural integrity of the pipe coil 53. The pipe 53 may further be provided with one or more pressure relief valves 56 to prevent an unsafe pressure buildup within the pipe 53. The enclosure 50 of the preheated unit is mounted on a stand 40 which is substantially identical to that of the separation unit.

The present apparatus is operated by positioning one or more of the separation units and optional preheater units in a directional orientation such that the translucent face panels 23 are facing the sun. The angle of inclination of the flow plate 20 in the separation unit is adjusted to optimize the amount of radiant solar energy recovered by the flow plate 20 and simultaneously to optimize the velocity of the volatile-containing water across the flow plate 20.

The present process is initiated by feeding the volatile-containing liquid, which is optionally preheated, into the inlet 21 at the top of the separation unit by means such as a pump. Generally, even before the liquid is fed to the present apparatus, it is pretreated by separating as much of the volatile components as possible from the volatile-containing liquid via mechanical means such as gravity separation, to reduce the demand on the separation unit and increase its efficiency and throughput. From the inlet 21, the liquid flows directly into the distributor 36, which distributes the volatile-containing liquid uniformly across the entire width of the flow plate 20. The liquid flows downwardly across the flow plate 20 in the channels 35 formed in the flow plate 20, while it is simultaneously agitated by means of the surface lattice structure 38 and heated by the flow plate 20.

The heat source for the flow plate 20 is radiant solar energy passing through the translucent face panel 23 of the separation unit and absorbed by the flow plate or heat conducted to the plate by a source such as an electric heating element 34 in contact with the panel. These heat sources can be used in the alternative or in combination. The conductive heat source 34 enables one to perform the present process when sunlight is inadequate or altogether absent.

As the liquid flows downward across the flow panel 20 a stripping gas is fed to the bottom 26 of the separation unit and into the head space 22 of the unit by means of a gas blower. The stripping gas flows upward through the head space 22 of the separation unit, contacting the falling liquid in a countercurrent manner.

The stripping gas is withdrawn from the top 27 of the separation unit after it has removed substantially all of the volatiles from the volatile-containing liquid feed to the separation unit. At this point, the stripping gas and volatiles can be vented directly to the atmosphere or the volatiles can be recovered from the stripping gas.

The stripping gas can be any gas which is inert with the volatile-containing liquid and is substantially insoluble in the liquid medium at the operating conditions of the separation unit. Air taken directly from the atmosphere is generally the preferred stripping gas of the present invention.

A volatile-free liquid is withdrawn from the outlet 25 at the bottom of the separation unit. At this point the liquid may be recovered, released to the environment or recycled back to the separation unit via inlet 24 for the removal of additional volatile components from the liquid.

The mechanism of stripping the volatiles from the liquid is believed to be enhanced by a combination of two factors, agitation and heat. Agitation of the liquid as it flows across the flow plate 20 improves the contacting between the volatile-containing liquid and the stripping gas. Heat transferred from the flow plate to the volatile-containing liquid tends to drive the volatiles from the liquid into the stripping gas.

The separation unit is generally operated according to the following process conditions. The inlet temperature of the stripping gas is greater than about 0° C. and preferably between about 5° C. and about 50° C. The outlet temperature of the stripping gas can be within this same range, but is generally somewhat higher than the inlet temperature of the stripping gas due to solar heating and heat transfer from the liquid.

The inlet temperature of the volatile-containing liquid without preheating is greater than about 0° C. and preferably between about 5° C. and about 30° C. With preheating, the liquid inlet is between about 5° C. and about 95° C. and preferably between about 15° C. and about 85° C. The outlet temperature of the substantially volatile-free liquid is substantially within the same range as the inlet temperature, but is generally higher than the inlet temperature of the liquid due to heat transfer from the flow plate. The unit is generally operated at ambient atmospheric pressure.

The volumetric flow rate of the stripping gas through the unit is about 0.01 to about 1.0 cubic meters per second. The volumetric flow rate of the liquid through the unit is about 0.01 to about 500 liters per second and the velocity is about 0.1 to about 1.0 meters per second. This corresponds to a liquid residence time on the flow plate of about 1 to about 30 seconds and preferably about 3 to about 10 seconds.

The typical volumetric throughput of stripping gas in the separation unit is generally higher than that of liquid. The volumetric ratio of stripping gas to liquid through the unit is between about 26.4 and about 26400 and preferably between about 264 and about 2640.

The process is operable over a wide concentration range of total volatile components in the volatile-containing liquid feed. However, the process is most effective when the concentration of total volatile components in the volatile-containing liquid is relatively low, i.e., between about 0.01 ppm and about 2500 ppm and preferably between about 0.1 ppm and about 150 ppm. The efficiency of volatile component removal from the liquid is preferably about 20% to about 100% and most preferably about 80% to about 100%. A liquid, which has been treated by the present process and wherein the degree of volatile component removal is within the above-stated efficiency ranges, is termed herein "a substantially volatile-free liquid" although the substantially volatile-free liquid may still contain some volatile components.

The angle from the horizontal of the flow panel 20 is generally set from about 15° to about 75° and preferably about 30° to about 60° to achieve the above-described flow rates and temperature ranges.

The apparatus and process of the present invention have particular utility for the treatment of surface or groundwater which has been contaminated with volatile organic compounds, such as hydrocarbons or organic solvents. Hydrocarbons which are readily removable from water by the present process are refined fractions of petroleum such as gasoline, heating oil or kerosene.

The present invention has specific utility for the treatment of groundwater which has been contaminated by leakage from underground gasoline storage tanks at service station sites. The apparatus can be mobilized and transported to the site. The contaminated groundwater is pumped via a well to the surface and as much gasoline as possible is separated from the water in a gravity separator. The contaminated water is then treated in the apparatus of the invention to separate the remaining gasoline dissolved in the water. The gasoline is recovered and the contaminant-free water is returned to the environment.

Another application for the present invention is the petreatment of process water and specifically polymerization reaction water. Connate water, which is commonly used as reaction water to manufacture polymers on-site for oil recovery applications, contains components such as hydrogen sulfide gas which degrade the polymer product. The present invention can be applied to remove the hydrogen sulfide gas on location from the connate water before it is fed to the reactor. The purified hydrogen sulfide-free reaction water produces a better grade of polymer product for oil recovery applications.

The following examples illustrate the apparatus and process of the present invention. The examples are not to be construed as limiting the scope of the invention.

EXAMPLE 1

A 150 liter volume of groundwater is contaminated with gasoline containing the following volatile hydrocarbon components: benzene, toluene, xylene, and ethylbenzene. The total concentration of volatile hydrocarbon components in the contaminated groundwater is 1.2 ppm. The groundwater is treated in the apparatus of the present invention to remove the volatile hydrocarbon components from it. The apparatus has one preheater unit which feeds into two separation units operating in parallel. The flow plates of the separation units are approximately 1.2 meters wide and have flow channels about 2.4 meters in length. The apparatus is positioned at an angle of 45° from the horizontal and pointed in the direction of the sun in a clear sky where the ambient air temperature is 21° C.

The volatile-containing ground water is pumped into the preheater unit at a volumetric flow rate of about 1.1 liters per minute. The inlet water temperature is 14° C. The water is heated as it flows through the preheater unit and is split into two equal streams after exiting the preheater unit. Each stream has a volumetric flow rate of 0.57 liters per minute. Each stream is fed to a separation unit where it is contacted with air as the liquid passes down a flow plate. The flow plate is 1.2 meters wide and 2.4 meters long. The head space in the separation unit is 5 centimeters high. The volumetric air flow rate in the separation unit is 2.8 m$^3$/min. The air inlet temperature is 21° C. The water has a residence time on the flow plate of 7 seconds. The outlet temperature of the water from the separation unit is 48° C. The total volatile hydrocarbon concentration in the water exiting the separation units is 0.2 ppm. This represents a volatile hydrocarbon component separation efficiency of 83%. The outlet temperature of the air is 24° C.

EXAMPLE 2

A process for making polyacrylamide in solution from acrylamide monomer requires a reactor feed water having an H$_2$S concentration below about 0.1 ppm. Use of a reaction water above this H$_2$S concentration is unacceptably corrosive to the process equipment and degrades the polyacrylamide product.

It is desirable to make polyacrylamide at oil field locations for immediate use in oil recovery applications. In one field, the best available water is a brine containing H$_2$S in a concentration of 5 ppm. Therefore, the brine is first treated in the apparatus of the present invention to reduce the H$_2$S concentration before the brine is fed to the polymerization reactor. The apparatus utilizes two separation units operating in parallel. The separation units are directionally oriented toward the sun in a clear sky at a 60° angle from the horizontal. A preheater unit is not used in the present apparatus because the feed water is excessively corrosive.

The pH of the brine is first adjusted to 5 with HCl. The brine is then pumped into each separation unit at a volumetric flow rate of 1.9 liters per minute. The separation units have the same dimensions as those of Example 1. The inlet water temperature is 15° C. Air is fed to the separation unit at a volumetric flow rate of 2.8 m$^3$/min and a temperature of 20° C. Brine is recovered from each separation unit having a temperature of 35° C. and an acceptable H$_2$S concentration of 0.01 ppm which is a 98% H$_2$S removal efficiency. The outlet air temperature from the separation unit is 25° C. The treated brine is suitable as feed water to the polymerization reactor.

While the foregoing embodiments of the invention have been described and shown, it is understood that alternatives and modifications, such as those suggested and others, may be made thereto and fall within the scope of the invention.

I claim:

1. An apparatus for separating a volatile component from a volatile-containing liquid to produce a substantially volatile-free liquid comprising:
   an inclined enclosure; a volatile-containing liquid inlet and a volatile-containing stripping gas outlet at an upper end of said enclosure; a substantially volatile-free liquid outlet and a stripping gas inlet at a lower end of said enslosure; a transparent face panel for admitting solar radiation into said enclosure;
   a flow plate positioned along an inclined plane within said enclosure to form a void space between said flow plate and said face panel, said flow plate having a top surface in liquid communication with said volatile-containing liquid inlet and said top surface facing said face panel to directly receive the solar radiation admitted into said enclosure;
   convex protrusions spaced at intervals on said top surface of said flow plate, said protrusions having a perpendicular orientation relative to the inclination of said flow plate to agitate liquids flowing down said top surface of said flow plate;
   a stripper gas conveying means at said stripper gas inlet for conveying a stripper gas upwards through said void space; and a volatile recovery means in fluid communication with said volatile -containing stripping gas outlet.

2. The apparatus of claim 1 further comprising a plurality of channels formed in said top surface of said flow plate and aligned to form continuous downward fluid pathways from said volatile-containing liquid inlet to said substantially volatile-free liquid outlet.

3. The apparatus of claim 1 wherein said protrusions are a lattice structure affixed to said top surface of said flow plate.

4. The apparatus of claim 1 wherein said flow plate is made of metal.

5. The apparatus of claim 1 wherein said transparent face panel comprises dual plastic panes positioned a spacial distance apart.

6. The apparatus of claim 1 wherein the inclined plane along which said flow plate is positioned has an angle of inclination of at least about 30 degrees from the horizontal.

7. The apparatus of claim 1 further comprising a supplemental heat generating element in heat conductive communication with said flow plate.

8. The apparatus of claim 7 wherein said supplemental heat generating element is an electrical heating element.

9. The apparatus of claim 1 further comprising a preheating means having a preheated volatile-containing liquid outlet in fluid communication with said volatile-containing liquid inlet of said enclosure.

10. The apparatus of claim 1 further comprising a volatile-containing liquid pumping means in fluid communication with said volatile-containing liquid inlet.

11. A process for separating a volatile component from a volatile-containing liquid to produce a substantially volatile-free liquid comprising:
   (a) feeding a volatile-containing liquid to the upper end of an inclined enclosure;
   (b) distributing said volatile-containing liquid substantially downward across a top surface of an inclined flow plate positioned within said enclosure;
   (c) heating said flow plate by directing solar radiation onto said top surface through a transparent panel on the face of said enclosure;
   (d) transferring heat from said flow plate to said volatile-containing liquid flowing downward across said top surface of said flow plate;
   (e) agitating said volatile-containing liquid flowing downward across said top surface of said flow plate by means of spaced protrusions on said top surface aligned substantially perpendicular to the direction of liquid flow;
   (f) feeding a stripping gas to the lower end of said inclined enclosure;
   (g) conveying said stripping gas substantially upward countercurrent to the flow of said volatile-containing liquid through a head space within said enclosure above said flowing volatile-containing liquid;
   (h) entraining said volatile component from said volatile-containing liquid in said stripping gas as said gas flows through said head space;
   (i) exhausting said stripping gas and volatile component from the upper end of said enclosure; and
   (j) withdrawing said substantially volatile free liquid from the lower end of said enclosure.

12. The process of claim 11 wherein said flow plate is heated by means of a supplemental heat generating element in conductive heat communication with said flow plate.

13. The process of claim 11 further comprising preheating said volatile-containing liquid prior to step (a).

14. The process of claim 11 further comprising recovering said volatile component from said stripping gas after step (i).

15. The process of claim 11 further comprising releasing said volatile component to the atmosphere after step (i).

16. The process of claim 11 wherein said stripping gas is air.

17. The process of claim 11 wherein said volatile component is a hydrocarbon and said volatile-containing liquid comprises water and said hydrocarbon.

18. The process of claim 17 wherein said substantially volatile-free liquid is water.

19. The process of claim 17 wherein said hydrocarbon is gasoline.

20. The process of claim 11 wherein said volatile component is hydrogen sulfide gas and said volatile-containing liquid comprises water and hydrogen sulfide gas.

* * * * *

UNITED STATES PATENT AND TRADEMARK OFFICE
CERTIFICATE OF CORRECTION

PATENT NO. : 4,853,088
DATED : August 1, 1989
INVENTOR(S) : David D. Conway

It is certified that error appears in the above-identified patent and that said Letters Patent is hereby corrected as shown below:

Title page:

| | |
|---|---|
| References Cited Section: | Delete "Portea et al." and insert --Porter et al.--. |
| Col. 2, line 9: | Delete "evironment" and insert --environment--. |
| Col. 2, line 20: | Delete "is" and insert --shows--. |
| Col. 2, line 59: | Delete "charateristics" and insert --characteristics--. |
| Col. 3, line 39: | Delete "contructed" and insert --constructed--. |
| Col. 4, line 15: | Delete "trought" and insert --trough--. |
| Col. 4, line 56: | Delete "preheated" and insert --preheater--. |
| Col. 5, line 11: | Delete "downwardly" and insert --downward--. |
| Col. 6, line 62: | Delete "petreatment" and insert --pretreatment--. |
| Col. 8, line 40: | Delete "volatile -containing" and insert --volatile-containing--. |
| Col. 10, line 6: | Delete "volatile free" and insert --volatile-free--. |

Signed and Sealed this

Twenty-sixth Day of June, 1990

*Attest:*

HARRY F. MANBECK, JR.

*Attesting Officer*   *Commissioner of Patents and Trademarks*